United States Patent [19]

Hesford et al.

[11] Patent Number: 4,506,144
[45] Date of Patent: Mar. 19, 1985

[54] CONTROL FOR RADIANT HEATING

[75] Inventors: Frank W. Hesford; Jerome L. Lampe, both of Cincinnati; Paul Szekely, Mainville, all of Ohio

[73] Assignee: Cincinnati Milacron Inc., Cincinnati, Ohio

[21] Appl. No.: 399,852

[22] Filed: Jul. 19, 1982

[51] Int. Cl.$^3$ ............................................... H05B 1/02
[52] U.S. Cl. .................................... 219/497; 219/501; 219/358; 219/350; 219/349; 328/144; 328/161; 323/299; 323/319; 425/174.4; 264/25
[58] Field of Search ............... 219/349, 343, 350, 354, 219/356, 492, 491, 497, 501, 216, 358; 328/173, 144, 161; 264/25; 361/79, 80; 475/174.4; 323/235, 319, 902

[56] References Cited

U.S. PATENT DOCUMENTS

| 3,188,443 | 6/1965 | Hickok . | |
| 3,794,808 | 2/1974 | Takagi | 219/494 |
| 3,981,586 | 9/1976 | Scott | 328/161 |
| 4,079,104 | 3/1978 | Dickson et al. | 219/343 |
| 4,155,038 | 5/1979 | Merklinger et al. | 328/161 |
| 4,223,207 | 9/1980 | Chow | 219/501 |
| 4,340,807 | 7/1982 | Raskin et al. | 219/501 |
| 4,377,739 | 3/1983 | Eckert, Jr. et al. | 219/497 |

OTHER PUBLICATIONS

"Infrared Heating for People and Products", General Electric Publication, 1974.
SCR: High Power Control Tool—Control Engineering Magazine, Aug. 1966, pp. 69-73.
SCR: Zero Point Switching Eliminates FRI—The Electronic Engineer, Jan. 1968, pp. 46-48.

Primary Examiner—M. H. Paschall
Attorney, Agent, or Firm—Daniel P. Worth

[57] ABSTRACT

A control for the heating section of a blow-molding machine is provided. The control permits independent selection of periods for high and low power energization of each radiant heating element of the heating section heater assembly. Power is provided by an alternating current source and switching of the power to the heating elements is accomplished at the zero crossing points of the supply voltage. To regulate the power in the heating elements against variations of supply voltage from a nominal value, a duty cycle control scheme is provided for selectively applying and withholding full cycles of the supply voltage to the heating elements. The determination of whether a cycle is to be applied or withheld is made by computing a duty cycle ratio comparing the power available from a minimum voltage expected to the power available from the actual supply voltage. Supply cycle switching is accomplished to distribute the application of cycles in two during the periods.

7 Claims, 20 Drawing Figures

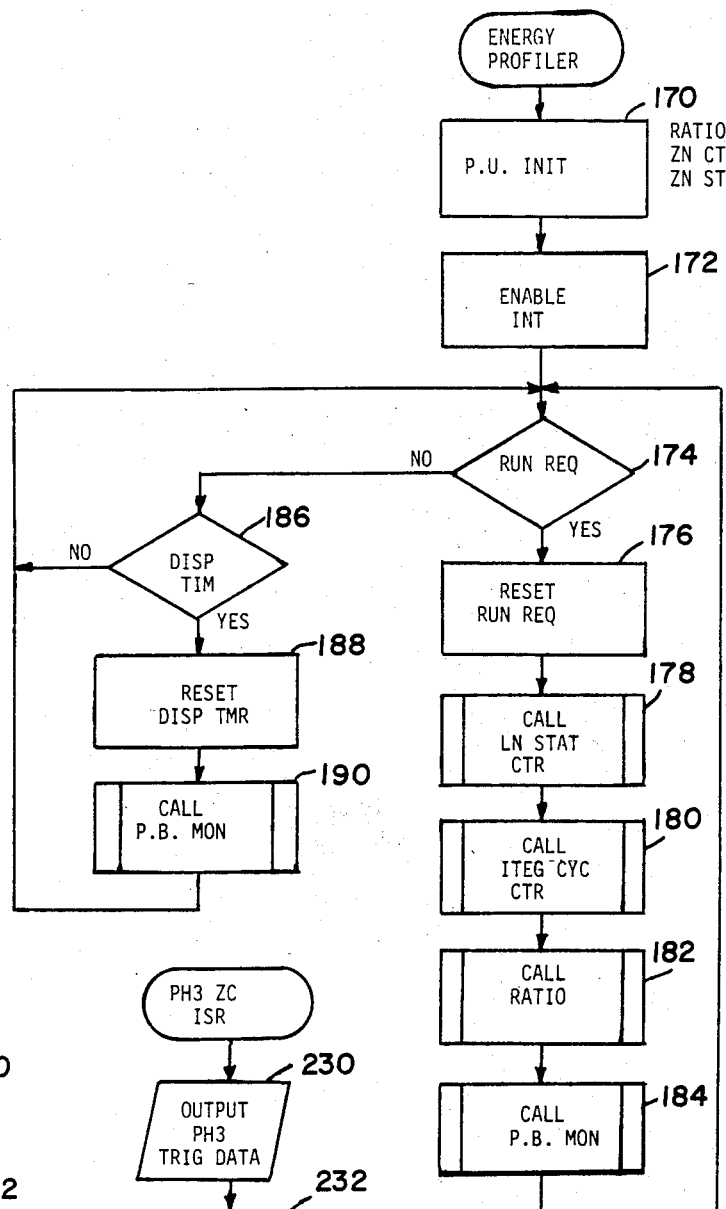
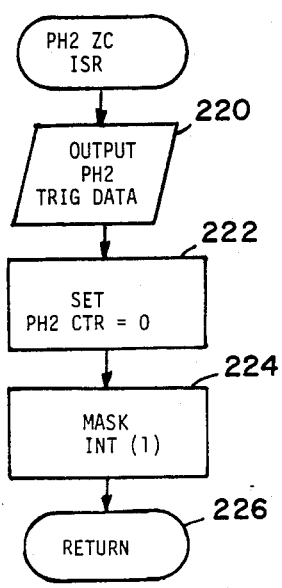
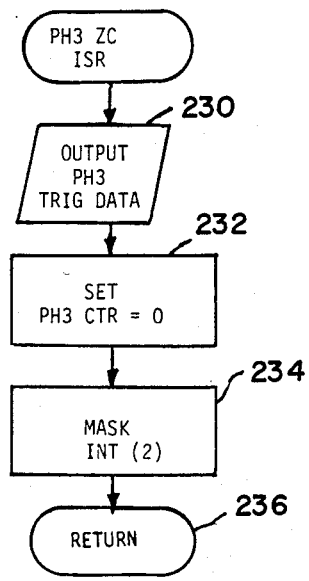
FIG.2a
FIG.2c
FIG.2d

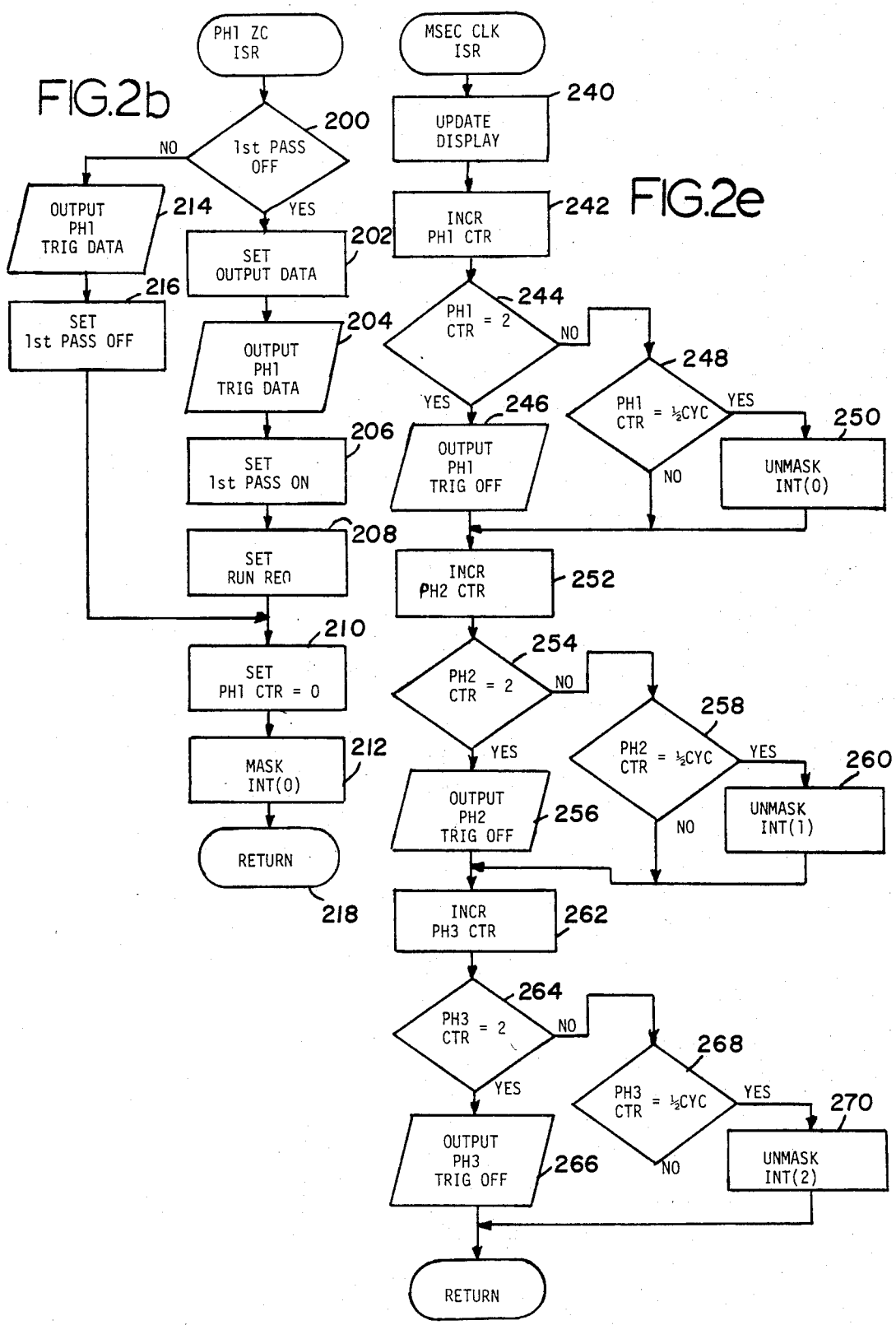

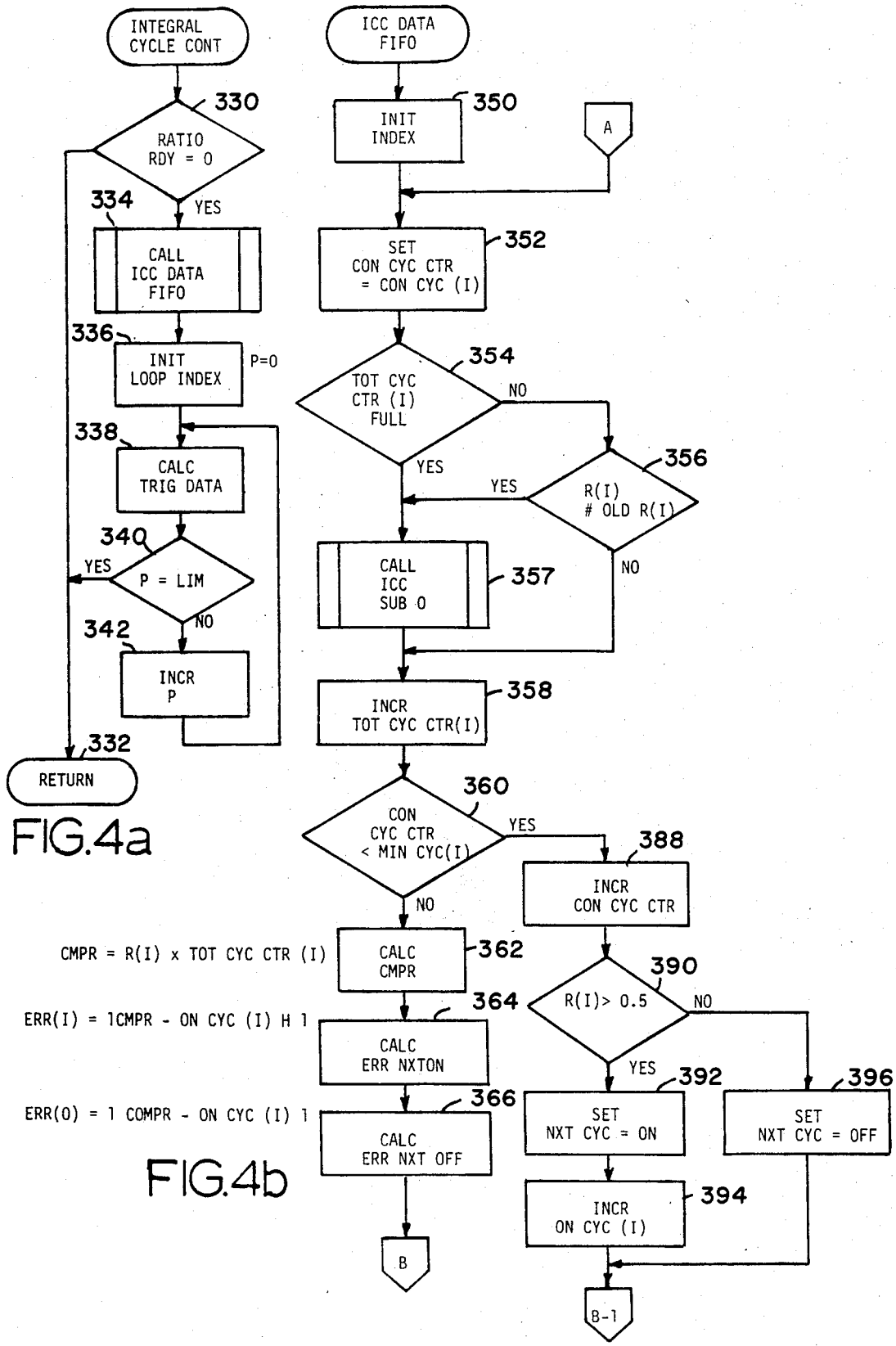

CONTROL FOR RADIANT HEATING

BACKGROUND OF THE INVENTION

This invention relates generally to oven control. In particular, the invention relates to control of radiant heating elements in the heating section of a blow molding machine where precise temperature control of preforms to be blow molded is essential to producing high quality finished products.

It is known to use radiant heat sources in the temperature conditioning section of blow molding machines where hollow thermoplastic preforms are heated to raise the temperature thereof to a level at which the preform material exhibits properties suitable for blow molding. An inherent advantage of radiant heating is that energy from the source is absorbed and transmitted by the material to be heated resulting in a more efficient conversion of energy to heat within the material as compared to convection or forced air heating. To achieve these benefits of radiant heating, the radiant heat sources must be operated at temperatures at which substantial quantities of energy are emitted at wave lengths within the absorption and transmission bands of the material to be heated. Nevertheless, conversion of this energy to heat at the surface of the material causes surface heating to proceed more rapidly than heating within the interior of the preform wall section. If this surface heating is permitted to proceed without intervention, material degradation will occur before the interior material has been raised to the desired temperature. Therefore, it is necessary to provide a means of controlling the overall heating operation to maximize the benefits of radiant heating while at the same time preventing surface overheating.

The prior art teaches the application of a heat exchanging gas to the surface of the preform while heating continues. This method has the disadvantage of removing heat from the preforms and adding complexity to the machine heating section. A preferable approach is to operate the radiant heat sources with alternating predetermined periods of high and low level energization to permit heat produced at the article surface during high level periods to be conducted inwardly thereof during low level periods. This control scheme has the further advantage that it provides a relatively simple means for accomodating variations of wall section thickness over the heated portion of the article. Specifically, by arranging the radiant heat sources so that a particular source is associated with a particular segment of the article surface, the independent adjustment of periods for that source provides control of the heat produced within the associated preform wall section segment. Selectable or programmable heat time control has the drawback that the total energy produced during the heating cycle is susceptible to variations of the incoming voltage supply. Thus, where the supply voltage is high or low compared to the nominal value total energy delivered to the radiant heat sources, and consequently, the total energy radiated to the articles, varies. These variations may thus randomly produce preforms which are inadequately heated or overheated and which result in unacceptable final articles. In previously known controls, regulation of power in the heating elements against supply variations required either temperature sensing and feedback or some type of analogue regulating circuitry such as conduction phase control. Both of these solutions add significant cost to the total heating control. Further, where conduction angle or phase control is used, one result of chopping cycles of the supply voltage is the production of high frequency noise at substantial power levels reducing the overall system efficiency.

It is, therefore, an object of the present invention to provide an apparatus for controlling the total electrical energy delivered to a load during a predetermined period of time from an alternating current source producing a voltage subject to variations from a nominal value.

It is a further object of the present invention to provide a programmable period cycle control for radiant heating ovens having means for monitoring the supply voltage and efficient means for regulating total power delivered to the heat sources.

It is a further object of the present invention to provide a programmable period cycle control for radiant heating ovens having means for monitoring an alternating current supply voltage and means for selectively applying cycles thereof to radiant heat sources to regulate the total power delivered to the radiant heat sources during the heating cycle.

It is a still further object of the present invention to provide a programmable period cycle control for radiant heat ovens having independently programmable high and low power periods for each of a plurality of radiant heat sources and means for monitoring an alternating current supply voltage and means for selectively applying cycles thereof to the radiant heat sources according to a duty cycle ratio and prediction algorithm to produce a predetermined total energy emission from each heating element during a heating cycle in accordance with a difference between the actual measured voltage and a predetermined minimum voltage.

Further objects and advantages of the present invention shall become apparent from the accompanying drawings and the following description thereof.

SUMMARY OF THE INVENTION

In accordance with the aforesaid objects, a programmable period cycle control is provided for controlling periods of high and low power energization of radiant heat sources. The control permits independent selection or programming of the high and low power periods for each of a plurality of heat sources. Power regulation in the heat sources is provided by means for selectively applying individual full cycles of the alternating current supply voltage to the heat sources. The determination of whether the cycle is to be applied is based upon a supply voltage duty cycle ratio computed as the ratio of power of a predetermined minimum voltage to the power available from an actual voltage measured by the control. Cycles are applied to the load when a duty cycle error function comparing an extrapolated accumulated duty cycle to the duty cycle ratio predicts minimum error for applying the next cycle. Voltage measurements are made periodically and a filtering algorithm is used to limit changes of ratio values to voltage changes exclusive of supply line noise.

BRIEF DESCRIPTION OF THE DRAWINGS

FIGS. 2a through 2e are flow charts of the overall control procedure and the primary interrupt procedures of the control of FIG. 1.

FIG. 3 is a flow chart of the heat cycle period control procedure, the execution of which is commanded by the procedure of FIG. 2a.

FIGS. 4a through 4d are flow charts of the supply voltage cycle selection control procedure called into execution by the procedure of FIG. 2a.

DESCRIPTION OF THE PREFERRED EMBODIMENT

For purposes of illustrating the invention, a programmable period cycle control for a radiant heating oven of a blow-molding machine manufactured by Cincinnati Milacron Inc., the assignee of the present invention, shall be described in considerable detail. The particular configuration of this machine and the adaptation of the control of that configuration are not to be construed as limitations on the present invention. Rather, it should be appreciated that the present invention has applicability to any control for radiant heating based upon energization of the heat elements including duty cycle regulation against variations of the supply voltage.

Figure 1:
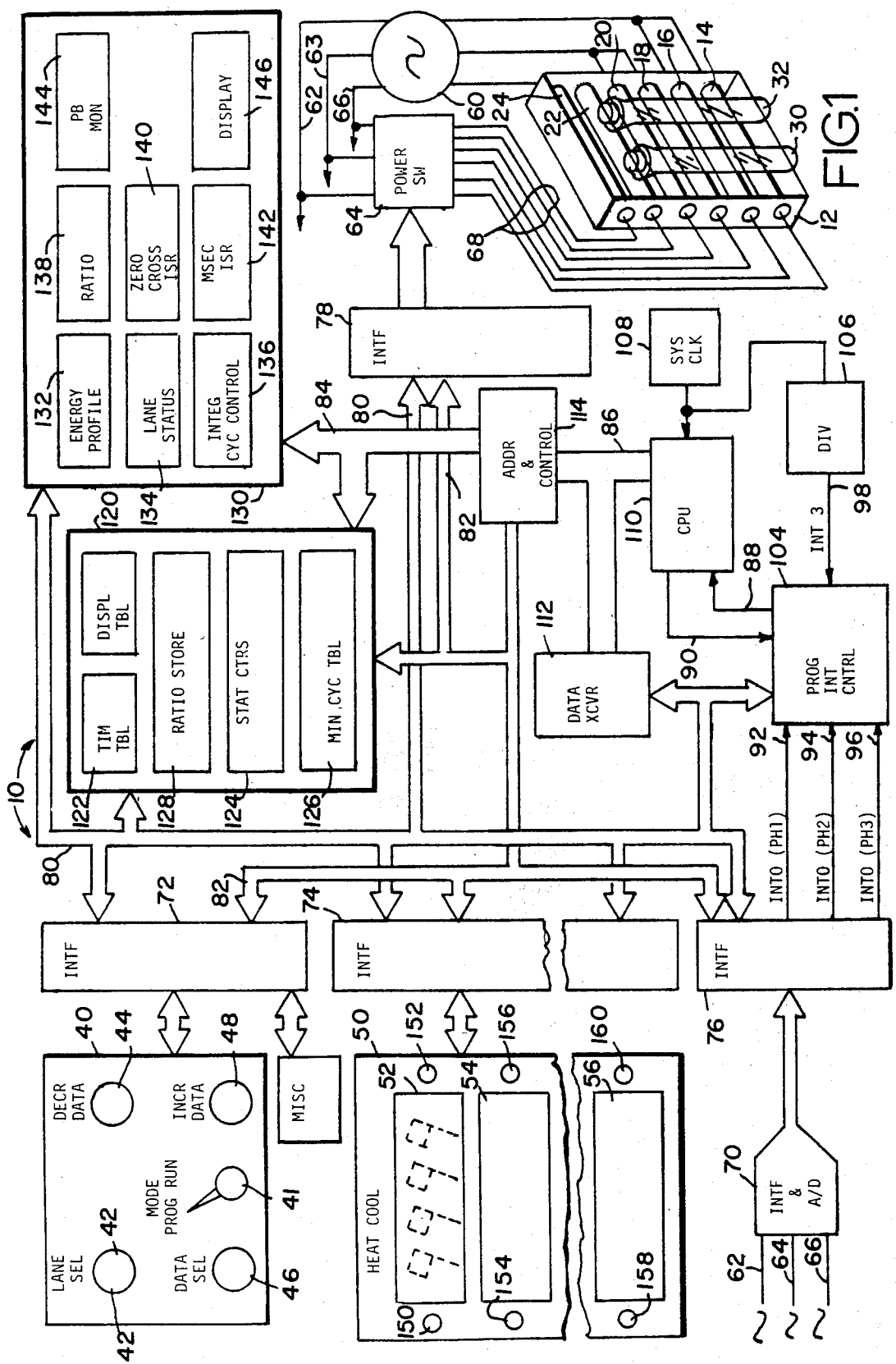
FIG. 1 is a block diagram of a programmable period cycle control representing an embodiment of the present invention.

Referring to FIG. 1, the control 10 applies power from the alternating current, three-phase voltage source 60 to radiant heat elements 14 through 24 by means of the solid state switches at 64. Heat sources 14 through 24 are arranged in assembly 12 so that when thermoplastic article preforms such as 30 and 32 are suspended as shown adjacent to heat source assembly 12, energy emitted from a particular heat source is directed primarily to an associated segment of the wall section of an article preform. Heat sources 14 through 24 are quartz envelope tungsten filament lamps which are operated at temperatures between about 1000 and about 2000 degrees Kelvin. The tubular quartz lamps used in assembly 12 are commercially available and are arranged in a more or less planar array to produce the simplest construction. Preforms such as preforms 30 and 32 are rotatably suspended in proximity to heating assembly 12 during their respective heat cycles. The thermoplastic preforms illustrated are typical of those used in the bottle-making industry. For application in soft drink containers, these preforms are produced from the thermoplastic, polyethylene terephthalate (PET) which exhibits excellent barrier properties when biaxially stretched by a blow molding process. The object of the temperature conditioning section of a blow molding machine is to raise the temperature of the thermoplastic material in the formable portions of the article preform to a temperature known as the molecular orientation temperature. When biaxial stretching of the preform body occurs for material at the molecular orientation temperature, the resultant barrier properties of the finished product are maximized. Over the length of the preform, the wall section thickness varies as dictated by the design of the finished article. Therefore, to accommodate these variations in wall section thickness while at the same time achieving uniform heating throughout the formable portion of the preforms, it is desirable to provide independent control of the high and low power periods for each of the quartz lamps 14 through 24. It should be noted that the object of the low power period is to permit heat at the preform wall section surface to be conducted inwardly thereof. While a period of no energization would serve equally as well with regard to preform heating, the resultant thermal cycling would lessen the expected life of the quartz lamp heating filaments. The independent control lines from power switches 64 to heating elements 14 through 24 are shown as the bundle of lines 68. The combination of heater assembly 12 and preform carrying and conveying apparatus (not shown) constitutes a lane of the heating section of a blow-molding machine. In actual practice, the heating section will contain a plurality of lanes and within each lane the quartz lamps define heating zones.

Programming, i.e., selecting of the high and lower power periods of quartz lamp energization is accomplished through the operator's panel 40 and display panel 50. The lane for which data is to be entered is selected by means of the selector switch 42 and the zone for which data is to be entered is selected by means of the push button 46. Indicating lights 150 through 160 on operator panel 50 are illuminated sequentially to indicate the selected zone display and whether heat or cool data is accessible for modification or entry. When the desired data selection has been made, the decrement data and increment data push buttons 44 and 48 are used to effect the updating of data in the selected digital display of displays 52 through 56. Two digits are provided for the high and low power energization periods and are based upon a resolution of 1/10th second. Thus, the maximum high or low power period is equal to 9.9 seconds. When data has been entered for all zones of all lanes, the mode selector 41 is set to the run position.

Regulation of the power in the quartz lamp loads 14 through 24 is accomplished by monitoring the incoming voltage from alternating current source 60. Voltages for each of the three phases appear on lines 62 through 66 which are inputs to interface and analogue-to-digital converter 70. Comparison of the measured voltage against a predetermined minimum voltage determines the duty cycle of application of the incoming supply voltage to the load during the programmed high and low power periods of energization.

Applicant's implementation of the control scheme is based upon a microprocessor. Applicants have chosen the 8085 microprocessor manufactured by Intel Corp. Continuing with reference to FIG. 1, the central processing unit 110 corresponds to the microprocessor. The central processing unit accesses data and executes operations thereupon in accordance with clock cycles determined by the system oscillator 108. The central processing unit transmits and receives data and addresses upon a common bus 86. A selected eight channels of this bus constitute a data bus communicating data through the data transceiver 112. Address and control lines are transferred through the address and control decoders 114. In this fashion, data are transferred to and from interfaces 72, 74, 76, and 78 as well as memories 120 and 130. The appropriate address is output on bus 86 which through control logic 114, accesses the desired object or source of data during a first portion of a data fetch cycle. Thereafter, the data is transferred by means of the data transceiver 112 and control signals during a subsequent portion of the data cycle. Interface address and control lines are carried by the common bus 82 to the interface devices 72 through 78. Memory address and control lines are carried by the common bus 84 to the memories 120 and 130. Data are transferred to and from interfaces 72 through 76 and memory devices 120 and 130 over the common data bus 80 and through data transceiver 112 to central processing unit 110. In normal operation, data are exchanged and manipulated in accordance with instructions and addresses recalled from memory in the order dictated by a stored program. The interruption of normal program execution is controlled by the programmable interrupt controller 104 which produces an interrupt input on line 88 to processing unit 110. The acknowledgement of this interrupt is a signal produced on line 90 as an input to the interrupt controller 104. Interrupt signals are produced in response to the zero crossing of the voltage of the supply voltages. The zero crossing detectors are included in interface 70 and generation of the interrupt signal occurs through interface 76 and is output on three discreet lines 92 through 96. An additional predetermined interval interrupt is provided by divider 106 which divides the frequency of system clock 108 to produce an interval signal on line 98. The use of and response to these interrupts shall be described in more detail subsequently.

Control of the power switches 64 is accomplished by central processing unit 110 by execution of programs stored in the read-only memory 103 and using storage areas of rewritable random access memory 120. Data tables consisting of the programmed periods together with data accumulated from monitoring the supply voltages are stored within memory 120. The primary control scheme programs stored in memory 130 include the energy profiler routine 132, the lane status procedure 134, the integral cycle control procedure 136, and the duty cycle ratio procedure 138. In addition, programs for servicing the interrupts including the line phase interrupt service routine 140 and the display interval service routine 142 are provided. Two additional programs relating to the operator's panel 40 and display panel 50 are provided. The PB monitor procedure 144 responds to the operation of switches and push buttons on panel 40 and thereby effects the programming of the energization periods. The display procedure 146 effects the periodic updating of displayed data in display panel 50. The specific details of inputting data from panel 40 and displaying data on panel 50 are not necessary to the present invention. Therefore, further details of the operation of these two programs will not be provided herein.

Referring to FIG. 2a, a flow chart of the energy profiler program corresponding to the program 132 of FIG. 1 is shown. The energy profiler program provides the overall system control for execution of the various control procedures. Upon the application of power to the control 10, a power up initialization procedure is executed as indicated by process step 170. The function of this procedure is to initialize variables used by other control programs in preparation for operation of the control. At process step 172, the control program execution interrupt commands are enabled. This permits the interrupt signals generated on lines 92 through 96 and line 98 to redirect the execution of programs stored in memory 130. Decision step 174 determines whether or not the run request flag has been set. This flag is set by execution of the phase 1 zero crossing interrupt service routine. If the run request flag has not been set, then the overall control procedure continues at decision step 186 where it is determined whether or not a display time interval has elapsed. If the display time interval as measured by a time counting subroutine, has not elapsed, then execution of this overall procedure continues by the return line on the NO side of decision step 186 to decision step 174. If, on the other hand, the display time interval has expired, then the procedure continues to process step 188 where the display timer is reset and thereafter to process step 190 where the push button monitor subroutine is called. Upon completion of execution of the push button monitor subroutine, the overall process would continue to be executed by return to the decision step 174. The branch beginning at decision step 186 permits data to be entered even when no heating element supply voltage is present to facilitate diagnosis of system faults.

If at decision step 174, it has been determined that the run request flag had been set, then the execution of the process would continue at process step 176 where the run request flag would be cleared. Thereafter, subroutine calls would be made by process steps 178 through 184 in sequence. Process step 178 calls for the execution of the lane status control procedure. Upon completion of that subroutine execution of the overall control process continues by the call of process step 180 to the integral cycle control subroutine. Upon completion of the integral cycle control subroutine, the overall process continues by the call of the duty cycle ratio subroutine at process step 182 and upon completion of that subroutine, the push button monitor procedure is called by process step 184. Following this sequence of subroutine calls, the overall system process is continued by the return line 2 decision step 174. It will be appreciated that by continued execution of the latter process loop control of the radiant heat source assembly 12 is continuous so long as the system is left in a running condition.

As is clear from the description of FIG. 2a, the overall control procedure is an interrupt-driven scheme. Absent the occurrence of an interrupt to set the run request flag, the overall control procedure would continue to process the brief loop from the NO side of decision step 174. As was stated with reference to FIG. 1, four principal interrupt signals have been provided. Three of these are associated with the zero crossing of the supply voltage and the fourth is the occurrence of the display time interval expiration. The interrupt service routines for the zero crossing of the supply voltage corresponding to program block 140 of FIG. 1 are illustrated by the flow charts of FIGS. 2b, 2c, and 2d.

Referring to FIG. 2b, the phase one zero crossing interrupt service routine is shown. Because a full cycle of the line voltage includes two zero crossings, and because the duty cycle control is intended to operate on full cycles of the incoming line voltage, the phase 1 zero crossing interrupt routine includes a software resettable latch for marking the occurrence of a full cycle of the phase 1 voltage. At decision step 200, the determination is made whether or not the zero crossing triggering the interrupt was the first zero crossing of the voltage cycle. If it is the first zero crossing of the incoming cycle, then process step 202 sets the output data for all three voltage phase triggers. To facilitate the cycle control applicants use silicon controlled rectifiiers (SCR) as the load switching devices of the power switches 64 of FIG. 1. Each SCR consists of an anode, a cathode, and a gate or trigger. Conduction from anode to cathode begins when the voltage at the cathode is negative with respect to the anode and the trigger is given a positive voltage. Conduction continues until the voltage at the anode is equal to or less than the voltage at the cathode. To achieve full cycle conduction of the supply voltage, two SCR's are paralleled for each load with the anode of one connected to the cathode of the other and with their triggers tied together. The trigger control data supplies a conduction triggering signal to the triggers of selected pairs immediately following the supply voltage zero crossing. Thus, switching transients are minimized at the onset of conduction. Trigger signals are terminated as will be described subsequently to effectively pulse the trigger inputs. Process step 202 is used to load the data to be applied to the trigger inputs for all the SCR's. At process step 204, the phase 1 trigger data is output through interface 78 and applied to the SCR trigger inputs. At process step 206, the first pass flag is set ON and at process step 208 the run request flag is set ON. Thereafter, at process step 210, a phase 1 interval timer is initialized to zero. At process step 212, the phase 1 zero crossing interrupt is masked to prevent the extraneous occurrence of zero crossing signals from being decoded as an interrupt. On the next occurrence of a phase 1 zero crossing interrupt the decision step 200 will determine that the first pass flag is not OFF and the interrupt service routine would continue at process step 214 where the phase 1 trigger data would be output. Thereafter at process step 216, the first pass flag is set OFF thus completing the cycle of the software full cycle latch. Following process step 216, the interrupt service routine continues at process step 210. Whether the service routine is called in response to the first zero crossing of a full cycle of the incoming voltage or the second zero crossing, upon completion of execution of the interrupt service routine, the overall process program execution is resumed by means of the return through terminal 218. Thus, the execution of the overall control procedure of FIG. 2a may be altered by the execution of the interrupt service routine of FIG. 2b and the setting thereby of the run request flag by process step 208.

The interrupt service routines for the zero crossings of phases 2 and 3 are illustrated by the flow charts of FIGS. 2c and 2d. Referring to FIG. 2c, upon the occurrence of the input voltage zero crossing, process step 220 effects the output of the phase 2 trigger data through interface 78 to the power switches 64. Thereafter, process step 222 initializes the phase 2 interval counter to zero. Process step 224 then masks the phase 2 interrupt. Return to the overall control procedure is effected through terminal 226. In a totally analogous fashion, the phase 3 zero crossing interrupt service routine is executed through process steps 230, 232, and 234 with a return through terminal 236.

Whether or not the trigger inputs to the SCR's were provided with a trigger signal, is determined by the overall control procedure. However, prior to the completion of the half cycle of the incoming voltage, the trigger signals will all be removed to insure that the SCR's will cease conducting if that is the desired condition at the occurrence of the next full cycle zero crossing. The resetting of the trigger signals is accomplished as part of a timing procedure associated with updating display data. This procedure is illustrated by the flow chart of FIG. 2e.

A one millisecond clock timing signal is produced by the divider 106 of FIG. 1 which produces the millisecond clock interrupt on line 98. The interrupt service routine corresponding to program 142 of FIG. 1 and illustrated by the flow chart of FIG. 2e is the routine used to respond to the interrupt of this one millisecond clock. At process step 240, the display data for one row of the display on panel 50 is output. At process step 242, the phase 1 counter initialized to zero by process step 210 of FIG. 2b is incremented. At process step 244, the counter contents are tested for equality with the quantity 2 and if equal to 2 the phase 1 trigger outputs are set to the OFF condition by process step 246. The effect of decision step 244 and process step 246 is to provide a relatively narrow trigger pulse to the SCR triggers which were commanded to be ON by the output data transferred by process step 204 of FIG. 2b. Once this initial period has passed, the decision step 244 will continue to find inequality with the quantity 2 and decision step 248 determines whether or not the phase 1 counter has been incremented to a quantity nearly equal to half the period of a full cycle. Upon the expiration of this one-half cycle interval, the affirmative side of decision step 248 leads to process step 250 where the phase 1 interrupt is unmasked. As the interrupt had been masked by process step 212 of FIG. 2b it will now be appreciated that the combination of that step along with decision step 248 and process step 250 of FIG. 2e is to provide a means of ignoring extraneous occurrences of zero crossings at the input for the phase 1 supply voltage. Totally analogous trigger pulse formation for the phase 2 SCR trigger inputs is effected by the process steps 252 through 260 considered in conjunction with process step 224 of FIG. 2c. Likewise, process steps 262 through 270 perform the same function for the phase 3 trigger input and with process step 234 of FIG. 2d provide protection against extraneous zero crossing inputs. Upon completion of the last step of the flow chart of FIG. 2e overall control procedure processing is resumed by the return through terminal 272.

As was previously stated, with the exception of the interrupts and their respective interrupt service routines hereinabove described, the overall control procedure processing conforms to the execution of subroutine calls as illustrated in FIG. 2a. The underlying control for the state of energization of the quartz lamps 14 through 24 of the radiant heat assemlby 12 is determined by the programmed high and low power energization periods.

Figure 3:
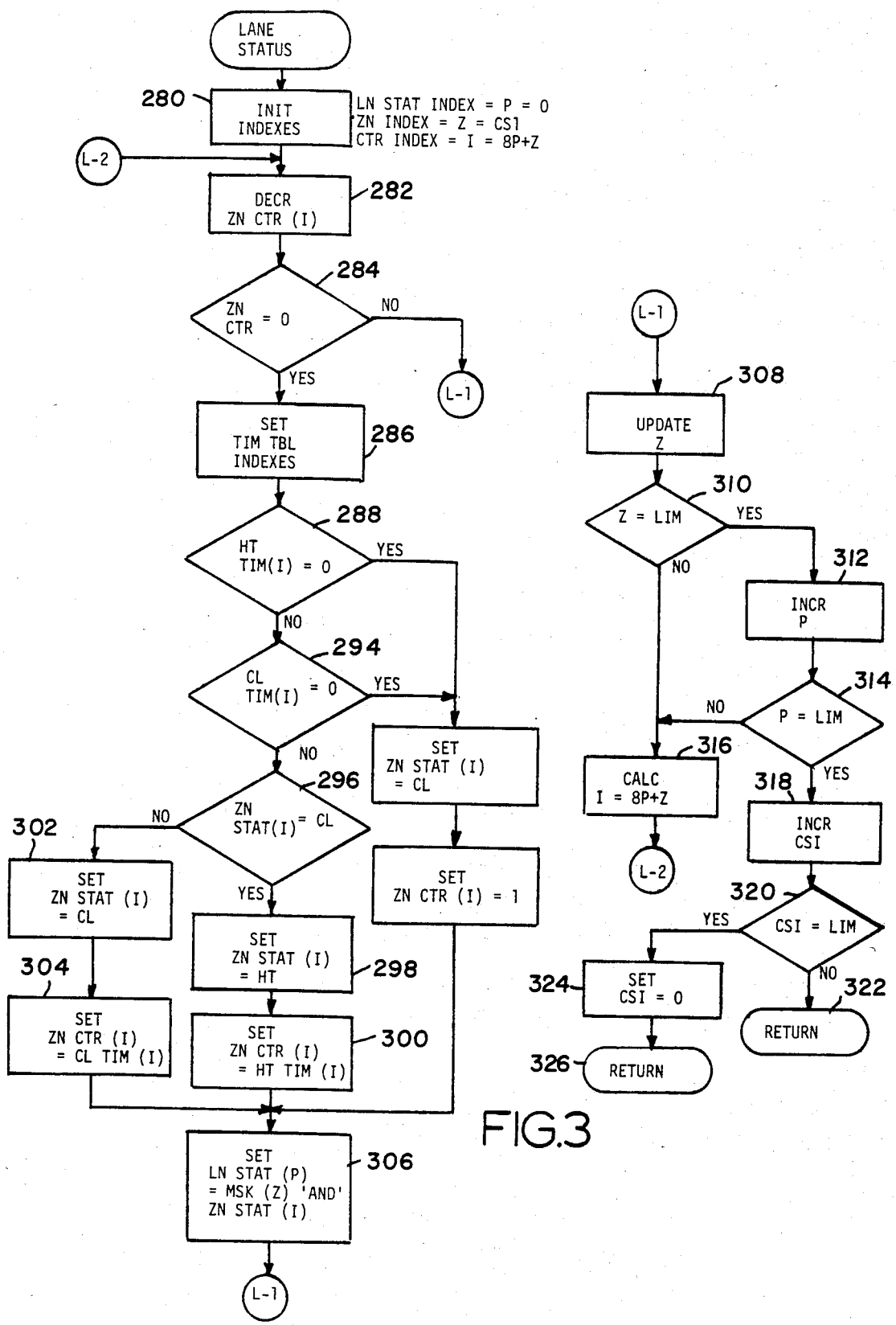

Measurement of the high and low power energization periods and determination of the high or low power status for each of the zones is controlled by the lane status control procedure corresponding to program 134 of FIG. 1 and illustrated by the flow chart of FIG. 3. Each zone has associated therewith a high and low power period. Considering the case where the machine heating station comprises three lanes each having eight zones, it will be appreciated that 24 individual interval measuring counters are required. Further, each counter can be preset to one of two values, that is, to a high power period value to produce a high power period signal or to a low power period value to produce a low power period signal. Since the object of the procedure of FIG. 3 is to produce data to be used in generating the power switch trigger input signals, it is necessary to first create the data indicating whether a zone is operating in its high or low power period. The zone status data can be represented by the state of a single bit associated with a zone which can then be combined with the bits representing the states of other zones to form lane status words. The generation of the lane status words is accomplished over several passes through the procedure of FIG. 3. In this manner, the interval data processing for all zones is completed once every 1/10th second. Storage for the program times is provided as a time data table 122 in memory 120 and storage for the current zone interval counter for each of the 24 zones is likewise provided in memory 120 as the status counters 124. Further, the resultant lane status words are stored in locations within memory 120. Access to the time table data and the current interval data is provided by means of indexes.

Referring to FIG. 3, at process step 280, the lane status control indexes are initialized. Here the zone index represented by Z is set equal to a counter service index which is initialized to zero by the power up initilization step 170 of the overall control procedure of FIG. 2a. The lane status word index represented by the letter P is set equal to zero and the zone counter index represented by the letter I is then set equal to the sum of the zone index and the product of eight times the status index. At process step 282, the zone interval counter idenfitied by the index I is decremented. At decision step 284, the contents of the zone interval counter are tested for equality with zero. If the counter has been decremented to zero, the period for the current status for that zone has expired, and processing continues at process step 286. Process step 286 sets the value of the time data table indexes to access the high power or heating period time and the low power or cool period time. At decision step 288, the determination is made whether or not the heat period programmed for the selected zone counter is equal to zero. If it is, then the process continues at process step 290 where the zone status is set equal to cool and thereafter at process step 292, the zone counter is set equal to 1. Under this circumstance, process step 290 represents a default condition if no heat period has been programmed. If, however, a heat period has been programmed then the process would have continued on the NO side of decision step 288 to decision step 294 where it is determined whether or not a cool period has been programmed. If the programmed cool period is equal to zero, then the default conditions are followed again from the YES side of decision step 294. If not, the process continues at decision step 296. At decision step 296, the current zone status is determined and if the zone status is equal to cool, then the status is changed to heat at process step 298. Thereafter, at process step 300, the zone interval counter is loaded or preset to the programmed value stored as the heat period under the counter index. The zone status for heat defines a heating period signal representing the period of time during which heating is to occur. If at decision step 296, it had been determined that the zone status was not equal to cool, then the status would be set to cool by process step 302 and thereafter, process step 304 would preset the zone counter to the value stored as the cool period under the counter index. In any event, once the status has been updated and the counter has been preset to the appropriate value, process step 306 sets the appropriate bits of the appropriate lane status word to reflect the current zone status.

Procedure index manupulation is illustrated beginning at process step 308 where the zone index is updated by adding thereto a constant chosen to effect distribution of counter processing over several passes through the lane status control procedure. Thereafter, at decision step 310 it is determined whether or not the zone index is equal to its associated limit value. If it is not, then a new counter index is calculated at process step 316. Thereafter, the overall lane status control procedure processing is continued through the connector L2 to process step 282. If decision step 310 had determined that the zone index limit had been reached, then the process continues at process step 312 where the lane status index is incremented. At decision step 314, the lane status index is tested against its associated limit and provided it is not equal with the limit, then a new counter index is calculated at process step 316 and as before overall lane status control procedure processing continues at process step 282. If, however, decision step 314 had determined that the lane status index were equal to its associated limit, then the counter service index would be incremented by process step 318 and at decision step 320, the counter service index would be tested against its associated limit. If the counter service index has not reached its limit, then a return to the overall control procedure of FIG. 2a is effected through terminal 322. If, however, the counter service index is equal to its limit then process step 324 sets the counter service index equal to zero and thereafter a return to the overall control procedure processing is effected through terminal 326. If it had been determined at decision step 284 that the selected zone counter had not been decremented to zero, then the selection of an alternate zone counter would be effected through the connector L1 continuing the lane status control procedure processing at process step 308.

By tying the execution of the lane status control procedure to the occurrence of the phase 1 zero crossing interrupt, the measurement of the passage of the programmed intervals is completed in a desired 1/10th second, the resolution of the programmed interval magnitudes, by spreading the counter processing for all counters over several passes through the counter status procedure. It will be appreciated that all counters could be updated in a single pass provided that the updating were tied to a 1/10th second clock signal. The index manipulation described depends on completion of a predetermined number of cycles of either 50 or 60 hertz supply voltage to define the 1/10th second interval desired for updating all the counters.

Referring again to FIG. 2a, following execution of the lane status control procedure, the integral cycle control routine corresponding to program 136 of FIG. 1 is called by process step 180. A flow chart representing the integral cycle control routine and its associated subroutines is shown in FIGS. 4a through 4d. The integral cycle control routine is used to produce the power switch trigger input data for controlling the application of full cycles of the supply voltage to the quartz lamps of radiant heat assembly 12. The integral cycle control routine determines whether or not the next cycle of the input voltage should be applied to a load depending on the ratio of minimum voltage to measured voltage and the current zone status, that is whether a heat or cool period is in effect.

Referring to FIG. 4a, the integral cycle control procedure begins at decision step 330 where a determination is made whether or not a line voltage stabilization delay has expired as reflected by a variable labeled ratio ready. The ratio ready variable is tested for equality with zero. At power-up initialization ratio ready is set equal to 2 and is decremented once for each completed ratio procedure execution. The effect is to delay execution of the integral cycle control routine until approximately 24 cycles of the phase 1 supply voltage have been made. If the ratio ready variable is not equal to zero, then the integral cycle routine is skipped as indicated by the direct line to the terminal 332 Once the ratio ready variable has been decremented to zero, the integral cycle control routine will be executed once for each phase 1 full cycle zero crossing. At process step 334, the integral cycle data subroutine is called for execution. Upon completion of the integral cycle data routine process step 336 initializes a loop index used to effect the calculation of trigger data. The results of the next cycle application determination of the integral cycle data subroutine are combined with the lane status data to produce the trigger data at process step 338 operating on one word at a time. At decision step 340 the loop index is tested against its associated limit and if the limit has not been reached, the index is incremented at process step 342 to bring the processing back to the calculation step 338. Once the loop index is found to be equal to its limit at decision step 340, the integral cycle control routine processing is complete and overall control procedure processing is continued by the return through terminal 332.

Figure 4C:
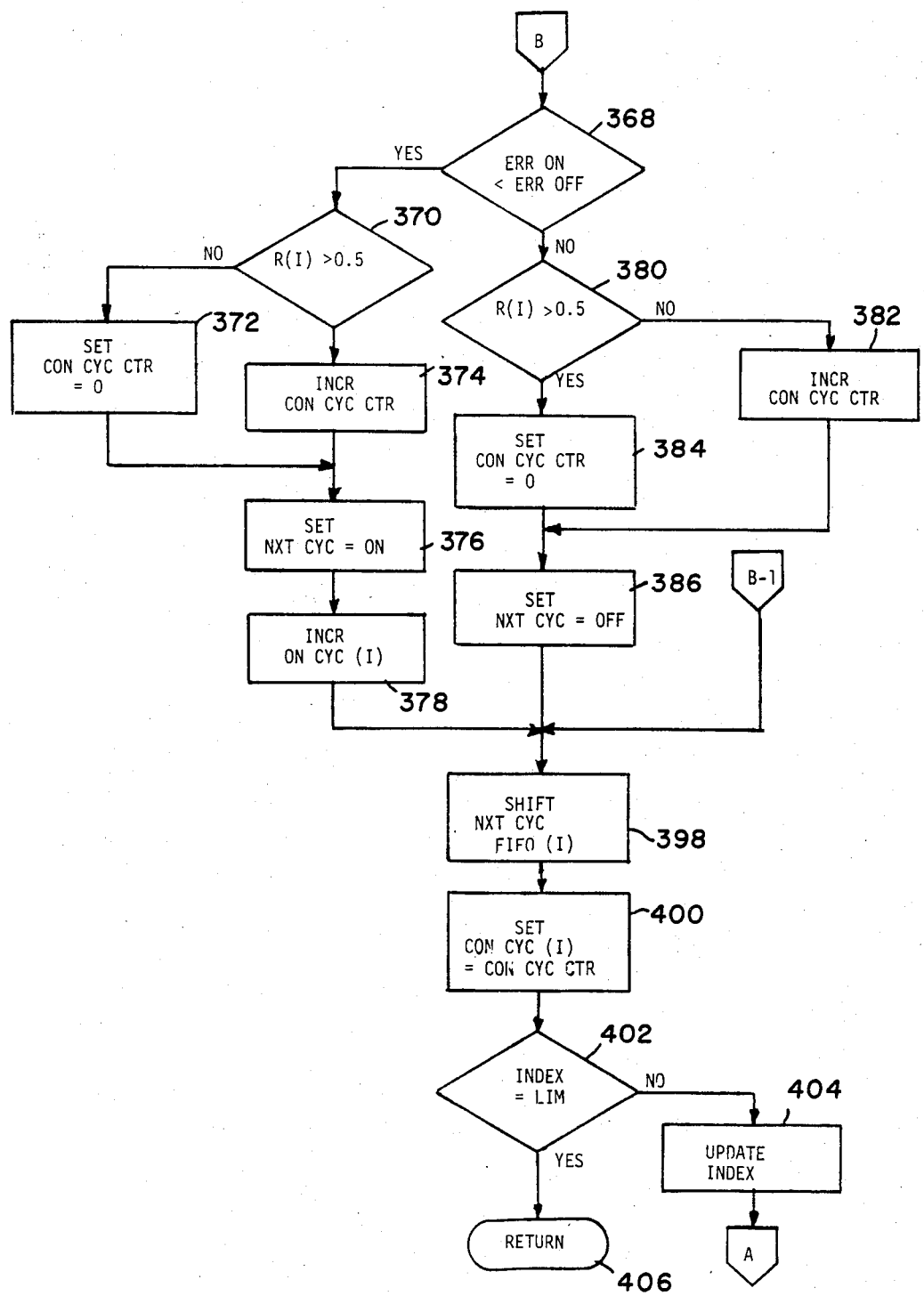

The integral cycle control data subroutine is illustrated by the flow charts of FIGS. 4b and 4c. The integral cycle control data subroutine maintains a total cycle count defining a total cycle signal representing the number of cycles produced by the source voltage for each phase and produces an error function to determine whether or not the next cycle of a selected phase should be applied to the load. A minimum error value consistent with the calculated ratio of predetermined minimum voltage to measured voltage for heat and cool intervals determines whether the next cycle should be applied or withheld from the load. The resultant next cycle determination is shifted into a data word which ultimately is combined with the lane status words to produce the zone trigger data.

Referring now to FIG. 4b, the integral cycle control data routine begins at process step 350 where the data index is initialized to zero. Thereafter, at process step 352, a consecutive cycle counter is set equal to the contents of the consecutive cycle store for the selected phase and status calculation. The consecutive cycle variable monitors the number of consecutive cycles applied or withheld from the load. At decision step 354, the total cycle countr identified by the index is tested to determine whether its contents are full. If not, the process continues at decision step 356 to determine whether the voltage ratio identified by the index is not equal to the prior value for that voltage ratio. If the present ratio value and the prior ratio value are equal, then the process continues at process step 358. If it had been determined at decision step 354 that the total cycle counter was full, or if it had been determined that the ratio value is not equal to the previous ratio value, then the process would continue at process step 357 where a call is made to a subordinate subroutine for adjusting the total cycle counter and consequentive cycle counter contents. This subroutine will be described in greater detail subsequently.

At process step 358, the selected total cycle counter is incremented producing a total cycle signal representing the number of cycles produced by the source including the just commencing cycle. Thereafter, at decision step 360, a test is made to determine whether or not the value loaded into the consecutive cycle variable is less than the minimum cycle value associated with the identified cycle counter. The minimum cycle value, recalled from table 126 of FIG. 1, is provided to insure that a minimum number of cycles of the supply voltage are applied to or withheld from the load to effect distribution in time of the proportioning of total cycles applied to the load. Assuming that the decision step 360 determines that the number of consecutive cycles is not less than the number of minimum cycles then the process continues at process step 362 where a duty cycle comparison value is computed as the product of a calcuated ratio recalled from the ratio store 128 of FIG. 1, and the number of total cycles. The error function depends on the number of cycles applied to the load as represented by an applied cycle signal. At process step 364, an error value is computed as the difference between the comparison value and the number of applied cycles plus one producing a duty cycle error signal representing the difference between the voltage duty cycle and the ratio of applied cycles including the cycle just commencing to the total number of cycles. At process step 366 a second error value is computed as the difference between the comparison value and the number of applied cycles producing a duty cycle error signal representing the difference between the voltage duty cycle and the ratio of applied cycles to the total number of cycles. The process continues through the connector B to decision step 368 of FIG. 4c where a determination is made whether the first error or second error is the lesser. If the error for applying the next cycle is less than the error for withholding the next cycle, then the process continues on the YES side of decision step 368 to decision step 370 where a determination is made as to whether or not the selected phase voltage duty cycle ratio is greater than one-half. When the duty cycle ratio is computed to be greater than one-half, the cycles counted by the consecutive cycle counter are cycles applied to the load. If, however, the selected ratio is equal to or less than one-half, then the cycles counted as consecutive cycles are those withheld from the load. If the selected ratio is greater than one-half then the consecutive cycle counter is incremented at process step 374 reflecting the decision to apply the next cycle. If the selected ratio is equal to or less than one-half, then the consecutive cycle counter is set equal to zero reflecting the interruption of events being counted by the consecutive cycle counter. In either case, the process continues at process step 376 where the next cycle variable is set equal to the value for ON, that is, the value for applying the next cycle to the load and thereafter at process 378 the selected ON cycle counter is incremented. In this manner the integral cycle data subroutine effects the selective application of full cycles of the source voltage to the load to conform the energy delivered thereto to that predictable from the minimum voltage value.

If it had been determined that a lesser duty cycle ratio error would result if the next cycle were withheld from the load or that the duty cycle errors were equal if the next cycle were to be withheld from the load, then the result from decision step 368 would be a negative determination and the process would continue at decision step 380 where the ratio is tested for the value being greater than one-half. If the ratio value is greater than one-half, then the consecutive cycle counter is counting applied cycles and the process would continue at process step 384 where the consecutive cycle counter is set equal to zero to indicate an interruption in the series of events being counted by the consecutive cycle counter. If, on the other hand, the selected ratio is equal to or less than one-half, then the consecutive cycle counter is counting withheld cycles and the process continues at process step 382 where the consecutive cycle counter is incremented. In either event, the process would continue at process step 386 where the next cycle variable would be set equal to the OFF value, that is, the value reflecting the next cycle is to be withheld from the load.

If it had been determined at decision step 360 that the number of consecutive cycles were less than the value established for the minimum cycles, then the process from decision step 360 would continue at process step 388 where the consecutive cycle counter would be incremented and thereafter to decision step 390 for a determination of whether or not the selected ratio is greater than one-half. If the selected ratio is greater than one half, then the next cycle variable is set equal to the value indicting an ON cycle at process step 392 and thereafter at process step 394 the ON cycle counter is incremented. If, on the other hand, the selected ratio were found to have a value equal to or less than one-half, the process would have continued at process step 396 where the next cycle variable would be set equal to the OFF value. In either event, this branch of the integral cycle data procedure is used to produce a continuity of the status of applying or withholding cycles from the load for an arbitrarily chosen minimum number of cycles to effect distribution of the application to or withholding of cycles from the load over a series of repeated cycles. The minimum cycle values are predetermined according to ratio values to best effect the desired distribution. The object being to produce a time averaged power in the load approximately equal to the desired power.

Whether the next cycle variable value has been established by process step 376, 386, 392, or 396, the process continues at process step 398. Continuation from the flow chart of FIG. 4b is accomplished through the OFF page connector B1. At process step 398, the next cycle data is shifted into the integral cycle control data word, identified by the index. Six words are produced, two words for each phase of the source voltage, one word representing data for high power periods and the other word representing data for low power periods. The individual bits of each word define selecting signals representing control commands for each radiant heating element or zone. Thereafter, at process step 400, the consecutive cycle storage is loaded with the value from the consecutive cycle counter at process step 400. At decision step 402, the integral cycle control index is tested for equality with its associated limit. If it is not equal to its limit then the index is updated at process step 404 and the integral cycle control data procedure is continued by the OFF page connector A at process step 352 of FIG. 4b. If it is determined at decision step 402 that the index is equal to the limit then the overall control procedure processing is resumed by the return through terminal 406 which would result in processing to be continued at step 336 of FIG. 4a.

Figure 4D:
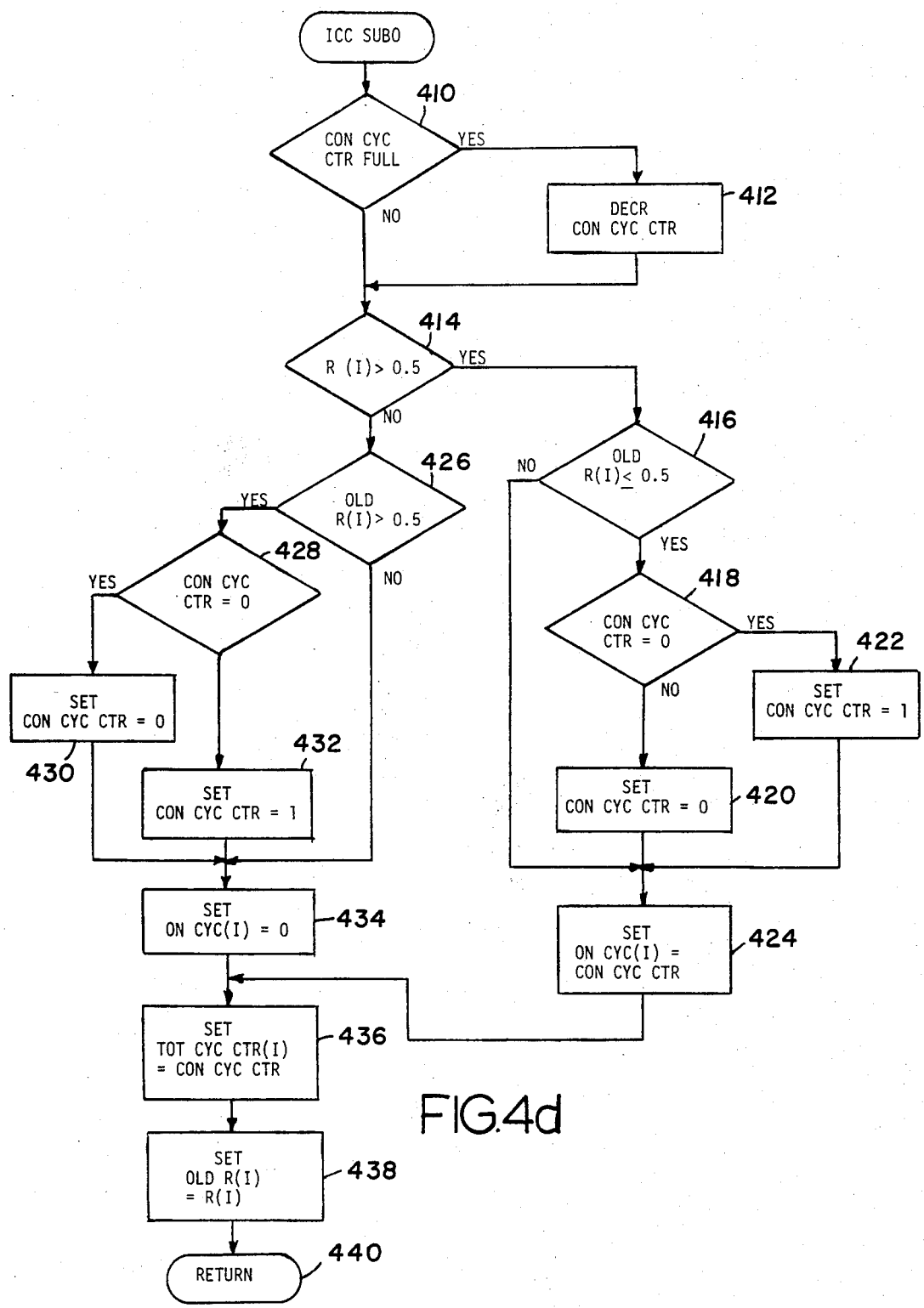

In the event that the last calculated ratio identified by the index is not equal to the old value for the same ratio or in the event that the total cycle counter storage identified by the index is full, the subroutine illustrated by the flow chart of FIG. 4d is called by process step 357 of FIG. 4b. The subroutine illustrated by this flow chart produces values of the consecutive cycle counter, the applied cycle counter and the total cycle counter for use by subsequent process steps of the integral cycle control data procedure. Beginning at decision step 410, the consecutive cycle counter is tested to determine whether or not it is full. If it is, then at process step 412 the consecutive cycle counter is decremented. If is not, the process would continue directly to decision step 414 where the value of the identified ratio is tested to determine whether or not is is greater than one-hald. If the ratio identified by the index is greater than one-half, then the process continues at decision step 416 where it is determined whether or not the prior value of the ratio identified by the index was less than or equal to one-half. If it was, then the result of the two decision steps 414 and 416 is the determination that the ratio has transitioned through one-half and the consecutive cycle counter must change from withheld cycles to counting applied cycles without producing a discontinuity in the heating process. The process continues at decision step 418 to determined whether or not the value of the consecutive cycle counter is equal to zero. If it is not, process step 420 sets the consecutive cycle counter value equal to zero. If it is already equal to zero, then process step 422 sets the consecutive cycle counter equal to 1. In either event, following the adjustment of the value of the consecutive cycle counter or if it had been determined at decision step 416 that the value of ratio identified by the index had not transitioned through one-half, the process would continue at process step 424 where the value of the ON cycle counter identified by the index is set equal to the value of the consecutive cycle counter.

If decision step 414 had determined that the value of the ratio identified by the index were less than or equal to one-half, then the process would continue at decision step 426 where it is determined whether or not the old ratio had been greater than one-half. If it is determined at decision step 426 that the old ratio had been greater than one-half, the result of decision steps 414 and 426 reflects that the ratio has transitioned through one-half and the consecutive cycle counter must change from counting applied cycles to counting withheld cycles without producing a discontinuity in the heating process. The process continues at decision step 428 to determined whether or not the consecutive cycle counter is equal to zero. If it is not, it is set equal to zero at process step 430 and if it is already equal to zero, it is set equal to the value of one at process step 432. If it had been determined at decision steps 414 and 426 that the current and old values of ratio were equal to or less than one-half, then the process would have gone directly to process step 434 where the value of the ON cycle counter is set equal to zero. This process step is also the continuation point following the process steps 430 or 432. Once the branches initiated at decision step 414 have produced the required values for the consecutive cycle counter and the ON cycle counter, the subroutine procedure continues at process step 436 where the total cycle counter is set equal to the value of the consecutive cycle counter. Thereafter, at process 438, the previous ratio value is set equal to the current ratio value and the integral cycle control data procedure processing is continued by the return through terminal 440. The adjustment of values of the consecutive cycle counter, the total cycle counter and the ON cycle counter of the subroutine of FIG. 4d serve to extend the history reflected by these counters when the determination has been made that the total cycle counter is full at decision step 354 of FIG. 4b. On the other hand the adjustment of the values when it is determined that the value of the ratio has transitioned through the one-half or midway point, provides a transition from the events being counted by the consecutive cycle counter.

As was previously stated the use of the control words produced by the lane status control procedure and the status words produced by the integral cycle control procedure is in the generation of the trigger data used by the interrupt service routines to control the trigger inputs of the SCR power switches. To this point, the generation of the values of the voltage ratios has not been discussed. The dependence of the integral cycle control routine upon these ratio values serves to make it clear that the overall control procedure depends on the combination of the programmed periods of high and low power energization, and the duty cycle ratios determined in response to the actual measured supply voltage.

Figure 5A:
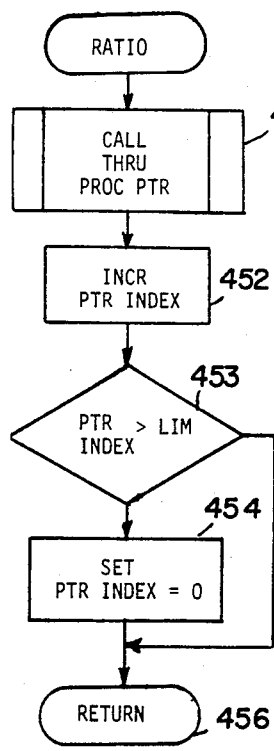
FIGS. 5a through 5i are flow charts of the procedures used to determine the duty cycle ratio of the actual supply voltage as compared to a predetermined minimum supply voltage.

The purpose of the duty cycle ratios is to provide regulation at the load against variations of the supply line voltage. The duty cycle ratio is computed based upon the assumption that the measured supply line voltage will vary with reference to a chosen minimum voltage required to produce a desired energy level at the load. Considering that the load resistance is not affected by the supply line voltage variations, the duty cycle ratio which is the ratio of energy that would be produced in the load by the chosen minimum or reference value of voltage compared to the energy produced by the actual or measured value of voltage is computed as the ratio of the square of the minimum voltage value to the square of the measured voltage value. The squares arising from the formula for computing power using a known voltage and known load (resistance). Two duty cycle ratios are produced for each supply voltage phase. One duty cycle ratio corresponds to the duty cycle required for a high power period and the second duty cycle ratio corresponds to the duty cycle required to maintain the desired energy level for the low power period. The integral cycle control procedure uses the numeric values of the computed ratios to proportion the application of cycles to the load by selectively applying or withholding full cycles of the incoming voltage to the quartz lamps by controlling the trigger data of the power switches. The computation of the duty cycle ratio values is accomplished under the ratio procedure corresponding to program 138 of FIG. 1 and illustrated by the flow charts of FIGS. 5a through 5i. FIG. 5a illustrates the overall ratio processing procedure. FIGS. 5b through 5g are subroutines called by the procedure of FIG. 5a. FIGS. 5h and 5i are subroutines called by the subroutines of FIGS. 5b through 5g.

Referring to FIG. 5a, the control of the ratio procedure processing is accomplished by use of a process pointer to call a selected subroutine with each pass through the procedure illustrated by the flow chart of FIG. 5a. The procedure pointer is initialized to zero by the power UP initialization routines executed by process step 170 of FIG. 2a. At process step 450, the process indicated by the process pointer is called. Upon completion of execution of this process or subroutine, the pointer index is incremented at process step 452 and at decision step 453 the index is tested against its associated limit and if equal to its limit set equal to zero by process step 454. If decision 453 had determined that the process pointer index was not equal to its associated limit, then the ratio execution is complete and return to the control procedure processing is made through terminal 456.

While there are six distinct subroutines called by the procedure pointer of the ratio routine, three of these are repeated for each phase of the incoming voltage being processed. Consequently, the completion of processing for all three phases requires the elapse of twelve cycles of a single phase of the supply voltage. This arbitrarily chosen processing rate produces satisfactory results for supply voltages having 50 to 60 hz frequencies.

Figure 5B:
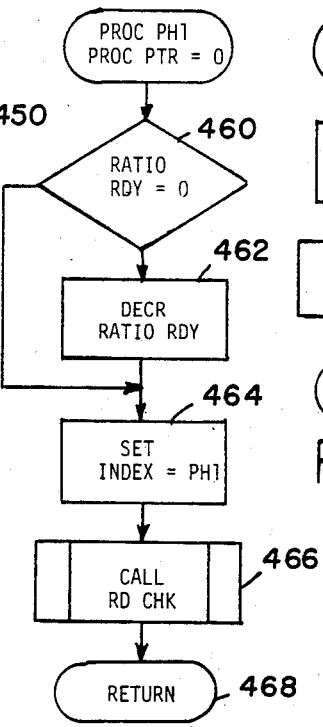
Figure 5C:
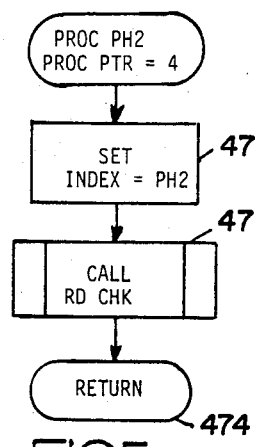
Figure 5D:
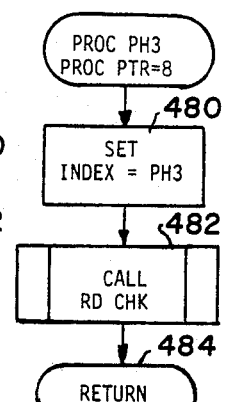

The flow charts of FIGS. 5b through 5d illustrate the input data processing associated with each of the supply voltage phases Phase 1 of the supply voltage is arbitrarily assigned as a lead phase. As was pointed out with reference to FIG. 4a, integral cycle control routine processing is inhibited until a delay period has passed during which the supply voltage is permitted to stabilize. Keeping in mind that the major routine processing is initiated in response to the occurrence of a zero crossing of the incoming voltage, it will be seen with reference to FIG. 5b that the line voltage stabilization delay requires the execution of the first two steps of FIG. 5b two times before the integral cycle control routine is permitted to be processed. That is, decision step 460 determines whether or not the ratio ready variable has been decremented to zero and if not, process step 462 decrements the ratio ready variable. Once this variable has been decremented to zero, no further decrementing takes place and the variable is left at a zero value until a subsequent power up initialization takes place. At process step 464 the input data index is set equal to the value corresponding to phase 1 and at process step 466 the data input subroutine is called. This completes the phase 1 processing control routine and a return to the overall control procedure processing is effected by the return through terminal 468. The phase 1 processing routine is activated when the procedure pointer has the value of zero.

The flow charts of FIGS. 5c and 5d are totally analogous to the flow chart of FIG. 5b with the exception that there is no preliminary processing of a ratio ready variable. The phase two process flow chart of FIG. 5c is executed when the process pointer index is equal to four and steps 470 and 472 effect the processing of the input data control procedure upon completion of which the return to the ratio control procedure of FIG. 5a is effected through the return of terminal 474. The processing of the phase three process flow chart of FIG. 5d is initiated when the pointer index is equal to eight and is completed by the execution of the data input process called by process 482. Upon completion of that procedure a return to the processing of the flow chart of FIG. 5a is effected through the terminal 484.

Referring now to FIG. 5h, the flow chart illustrating the data input process for the supply voltage shall be described. At process step 490, an actual voltage signal representing the actual voltage measurement for the phase identified by the index is input from interface 76. At process step 492, a command is output to the A to D converter 70 to reset the converter for the phase input brought in by step 490 and to select the next phase input to be accessed. At decision step 494, the actual voltage signal input by process step 490 is compared against a high voltage reference and if it is determined that the actual voltage value is greater than the high voltage reference, then the process continues at decision step 496. This decision step determines whether or not the high voltage period counter is equal to zero and if not, the process continues at process step 498 where the high voltage period counter is decremented. If the high voltage period counter has already been decremented to zero as determined by decision step 496 then the process continues at process step 500 where the high voltage flag is set to the true condition. The high voltage period counter is initialized by process step 502 when the decision step 494 produces a negative result. At process step 504, the high voltage flag is reset following the determination that the actual voltage is not greater than the high voltage reference.

At decision step 506, the measured voltage value is compared against a minimum voltage reference. If it is determined that the minimum voltage is greater than the actual voltage, then the process continues at decision step 508. In an analogous fashion to the branch for processing the detection of an actual voltage greater than the high voltage reference, the minimum voltage branch beginning at decision step 506 is used to determine whether or not the measured minimum voltage is merely a momentary fluctuation or a more severe aberration that would adversely affect the heating cycle. The decision step 508 tests the contents of the low period counter for equality with zero. If the counter is not equal to zero, then it is decremented by process step 510. If, on the other hand, the counter has previously been decremented to zero, then the low voltage flag is set by process step 512. In either event, the actual voltage is set equal to the minimum voltage by process step 514. If the branch decision step 506 has determined that the actual voltage is not less than the minimum voltage, then process step 516 initializes the low voltage period counter and thereafter process step 518 resets the low voltage flag. Both the high voltage and low voltage flags exist on a per phase basis so that an error condition may be indicated and specific error information may be provided to an operator by displaying appropriate error codes associated with the error flags.

Whether the branch decision step 506 initiates branch processing or processing falls through to process step 518 the overall data input process continues at process step 520 where local variables are set equal to the values measured for the actual voltage and the predetermined value stored for the minimum voltage. At process step 522, these local variables are squared and the resultant values are stored. The return through terminal 524 permits the continuation of the processing of flow charts 5b through 5d which are in fact completed upon the completion of the processing of the flow chart of FIG. 5h and consequently the return through the return terminals 468, 474, and 484 resume the overall ratio processing at process step 452 of FIG. 5a.

Figure 5E:
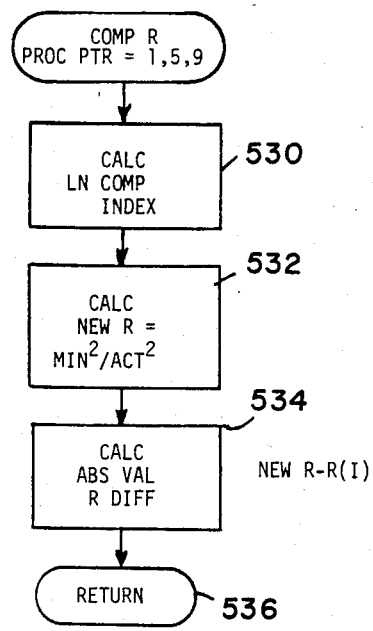
Figure 5F:
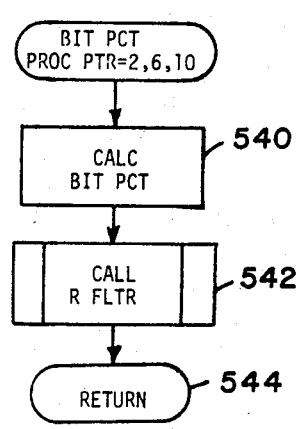
Figures 5G, 5I:
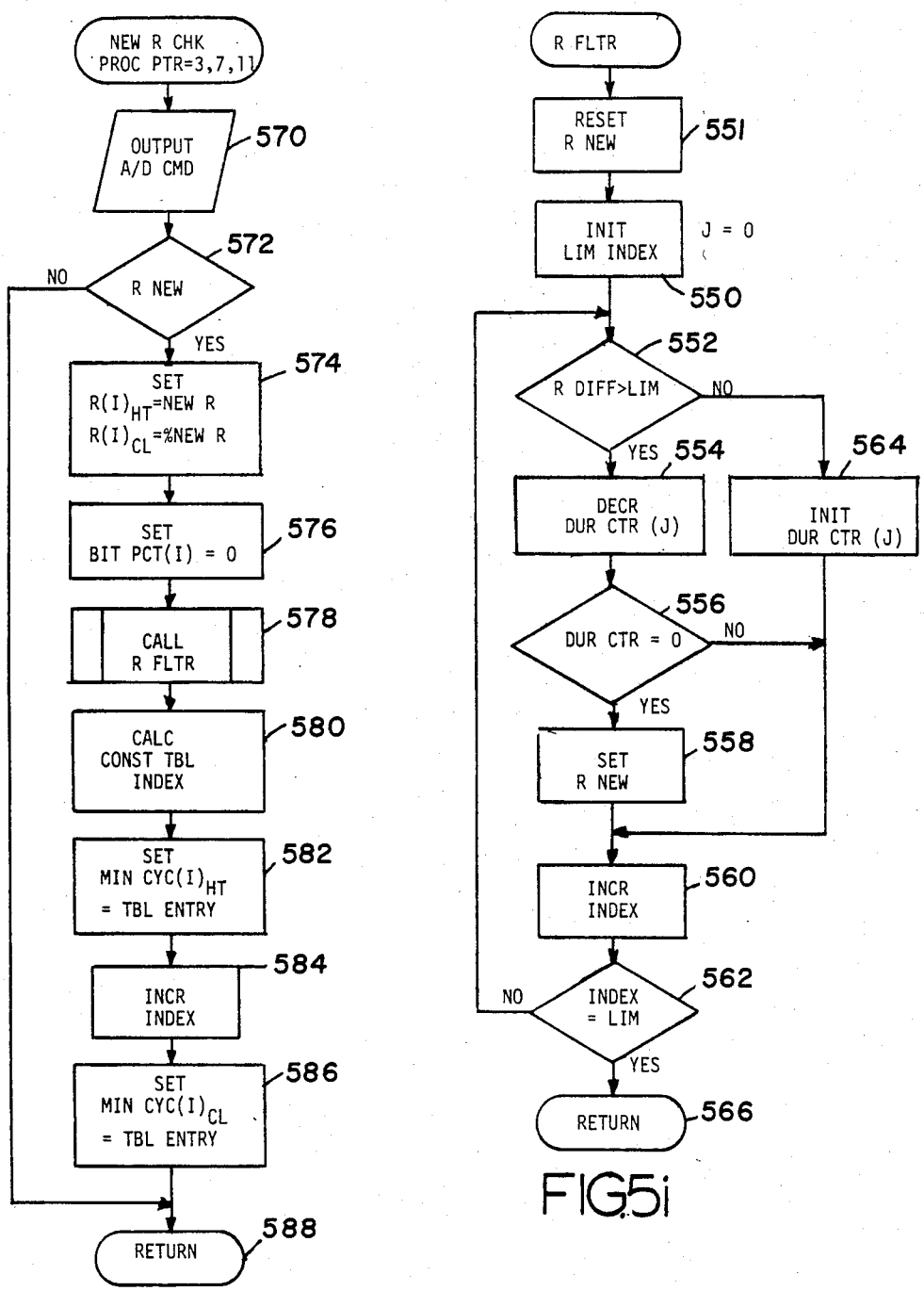
Figure 5H:
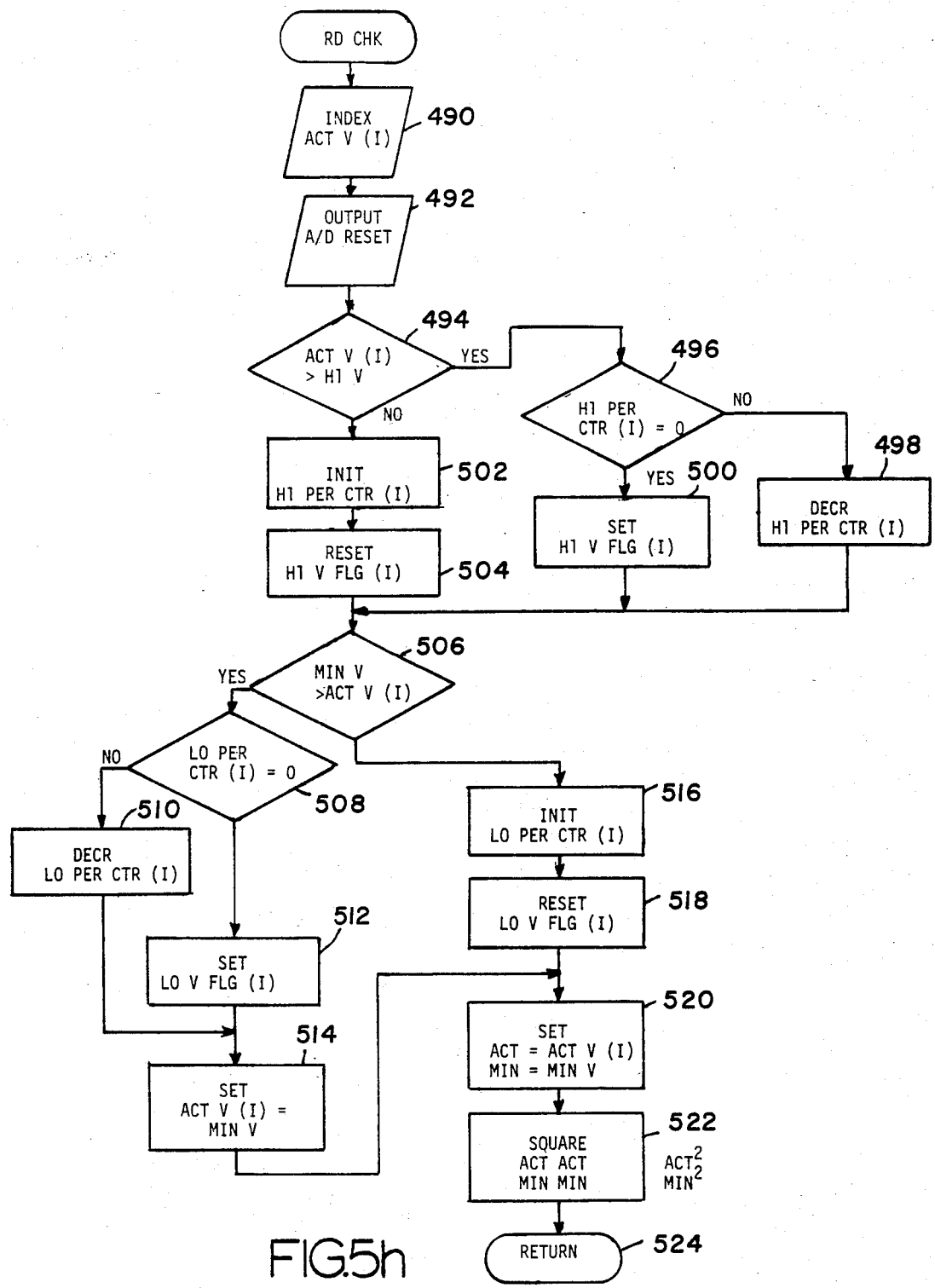

The flow charts of FIGS. 5e through 5g illustrate the remaining processing steps necessary to produce the ratio values used by the integral cycle control routine in preparation of the power switch trigger data. The flow chart of FIG. 5e illustrates the procedure for computing the duty cycle ratio value and this procedure is called when the process pointer index referred to with the discussion pertaining to FIG. 5a, is equal to 1, 5, or 9. Beginning at process step 530, the lane computation index which is used to associate the voltage duty cycle ratio of a selected phase of the supply voltage with the appropriate zones, is calculated. At process step 532, the actual ratio is calculated as the square of the minimum voltage divided by the square of the actual voltage to produce a duty cycle signal representing the ratios. At process step 534, a ratio difference used in a filtering procedure is calculated as the absolute value of the difference between the new ratio computed by process step 532 and the currently stored value of the ratio identified by the index. The processing of the procedure illustrated by the flow chart of FIG. 5a is resumed by the return through terminal 536.

The flow chart of FIG. 5f illustrates the procedure called when the procedure pointer has the value 2 or 6 or 10. This procedure is used to effectively filter out transient voltage variations on the supply line by determining whether or not a ratio change is of such magnitude and duration as to constitute a change necessitating the use of a new ratio value. At process step 540, the ratio difference calculated in process step 534 is converted to a percentage of the ratio of interest. At process step 542, a filtering subroutine is called. The terminal 544 permits a return to the processing of the flow chart of FIG. 5a.

The flow chart of FIG. 5i illustrates the filtering procedure called by process step 542 of the flow chart of FIG. 5f. At process step 550, the processing loop index is initialized. At decision step 552, the percentage difference indicated by the index calculated by process step 530 of FIG. 5e is compared against the first of a set of four magnitude limit values identified by the loop processing index initialized in process step 550. If the percentage difference is found to be greater than the selected limit, then the process continues at process step 554 where a duration counter is decremented. At decision step 556, the duration counter is tested for equality with zero. If equal to zero the percentage difference has exceeded the limit for a preassigned duration indicating that a new ratio value should be used by the integral cycle control routine. At process step 558, assuming an affirmative result from decision 556, the new ratio flag identified by the phase index is set true. If the decision step 556 had produced a negative result then process step 558 would have been skipped. In either event, the loop index is then incremented by process step 560 and at decision step 562 it is tested against its associated limit. If it is less than its limit, the filtering procedure is continued at decision step 552 where the selected percentage difference is tested against a different one of the series of limit values. Unique duration counters are established for each of the magnitude comparision values. Thus, with each pass through the loop, a different duration counter may be decremented as determined by the result of decision step 552. If decision 552 produces a negative result indicating that the percentage difference is not greater than the selected limit, the process continues at process step 564 where the selected duration counter is initialized to its maximum value. Thereafter, processing continues with the advance of the loop index at process step 560. Once decision step 562 determines that the loop index is equal to its limit value, the filtering procedure is complete and a return through terminal 566 and consequently through terminal 544 of FIG. 5f enables the continuation of the overall ratio processing of FIG. 5a.

One remaining procedure completes the set of subroutines used in ratio processing. FIG. 5g is a flow chart of the new ratio check procedure which is called into processing when the process pointer index has the values 3, 7, or 11. At process step 570, the command is output to the analogue-to-digital converter 70 through interface 76 to remove the reset from the A to D converter. This reset was applied by process step 492 of FIG. 5h. At decision 572, the new ratio flag is checked to determine whether or not the ratio filtering algorithm has set the new ratio flag. If it has been set, then process step 574 stores the new ratio value calculated by process step 532 of FIG. 5e at the ratio storage location of ratio store 128 of FIG. 1 identified by the primary phase index. This location identifies the duty cycle ratio associated with a high power period of energization. Process step 574 also stores a new value for the ratio associated with the low power period in ratio store 128. This value is calculated as the product of the new ratio and a preset minimum percentage value. At process step 576, the percentage difference value for this phase is set equal to zero. At process step 578, the ratio filter subroutine is called to clear values accumulated during the processing that led to the setting of the ratio new flag. At process step 580, an index into the table of minimum cycle values 126 of FIG. 1 is computed using the new value of ratio. At process step 582, a first table entry is stored in the minimum cycle location associated with a high power period of energization. At process step 584 the minimum cycle table index is incremented and at process step 586, the minimum cycle variable associated with a low power period of energization is loaded with the indicated table entry. As was previously stated, the minimum cycle values are predetermined and are associated with values of the voltage ratios. The minimum cycle values accessed by step 586 are stored with the ratio programs in memory 130. If the decision step 572 had produced a negative result the steps 574 through 586 would be skipped, but in either event processing of the overall ratio procedure would continue by means of the return through terminal 588. The effect of the process steps 574 through 586 is to store new values for the ratio of the identified phase, the values being associated with the high and low power periods of energization, and to store values in the local minimum cycle storage for high and low power periods of energization. As was explained with reference to the flow chart of FIG. 4b, the minimum cycle value serves to distribute in time the withholding or application of selected cycles to the load to produce a resultant average power conforming to the desired power in the load.

The minimum voltage value represented by a minimum voltage signal used in the ratio calculations is preset by hardware connections to produce binary values consistent with nominal voltages to be found in industrial environments. These values along with the low power period percentage value are established by hardware connections identified under the miscellaneous data inputs 49 of FIG. 1 interfaced through interface circuit 72. Acquisition of these constant values is accomplished during the power up initialization routines of process step 170 of FIG. 2a.

While the underlying algorithm for controlling the application of supply voltage cycle to the load is complicated by the necessity of controlling multiple phases against multiple loads, it should now be appreciated that the basic control scheme requires that a duty cycle signal be produced by comparison of the measured supply voltage against a reference value as represented by the minimum voltage signal. Two duty cycle ratio signals are produced for each supply voltage, one representing the ratio associated with the high power energization of the load, and the other representing the ratio associated with the low power energization of the load. Control of power to the load during the alternating high and low power periods of energization is then accomplished by applying or withholding full cycles of the supply voltage to the load as required to conform the proportion of applied cycles to total cycles to the duty cycle ratio based on the voltage calculation. The resultant regulation against supply voltage variations of power in the load is thus accomplished without resort to analogue circuitry that would necessarily require costly components to control the relatively high voltages and associated high load powers required in the radiant heating application.

While the invention has been described with reference to the preferred embodiment, and while this preferred embodiment has been described in considerable detail, it is not intended thereby to limit the invention to such detail. On the contrary, it is intended to cover all modifications, alterations, and equivalents falling within the spirit and scope of the appended claims.

What is claimed is:

1. Apparatus for controlling the total electrical energy delivered to a load during a predetermined period of time from an alternating current source producing a voltage subject to variations from a nominal value, the apparatus comprising:
   (a) means for producing a minimum voltage signal representing the minimum value the source voltage can reach;
   (b) means for producing an actual voltage signal representing the actual value of the source voltage;
   (c) means for producing a duty cycle signal representing a ratio of the square of the minimum voltage signal to the square of the actual voltage signal; and
   (d) means responsive to the duty cycle signal for selectively applying cycles of the source voltage to the load to conform the actual energy delivered to the load during the predetermined period to a value predicted from the minimum voltage value and also includes means for proportioning the number of total cycles to be applied to the load so as to distribute the applied cycles in time during the period further comprising
   (i) means for producing an applied cycle signal representing the number of cycles of the source voltage applied to the load during the period;
   (ii) means for producing a total cycle signal representing the number of total cycles produced by the source during the period including a cycle just commencing;
   (iii) means responsive to the duty cycle signal, the applied cycle signal, and the total cycle signal for producing a first duty cycle error signal representing the difference between the duty cycle signal and the ratio of applied cycles to total cycles;
   (iv) means responsive to the duty cycle signal, the applied cycle signal and the total cycle signal for producing a second duty cycle error signal representing the difference between the duty cycle signal and the ratio of applied cycles including the cycle just commencing to the total number of cycles; and
   (v) means responsive to the first and second duty cycle error signals for selectively applying or withholding the just commencing cycle to the load in accordance with the lesser of the duty cycle error signals.

2. The apparatus of claim 1 further comprising means for selecting the duration of the time period.

3. The apparatus of claim 2 wherein the load comprises radiant heat elements.

4. Apparatus for controlled radiant heating of thermoplastic elongated preforms for use in bottle-making by at least one radiant heating element energized from an alternating current source producing a voltage subject to variations from a nominal value, the apparatus comprising:
   (a) means for producing a heating period signal representing a time interval during which heating is to be controlled;

(b) means for producing a minimum voltage signal representing the minimum value the source voltage may reach;

(c) means for producing an actual voltage signal representing the actual value of the source voltage; and (d) means responsive to the heating period signal, the minimum voltage signal, and the actual voltage signal for selectively applying cycles of the source voltage to the radiant heat element to conform the power delivered thereto during the period of that predictable from the minimum voltage value that further includes (1) means for producing a duty cycle signal representing the ratio of the square of the minimum voltage value to the square of the actual voltage value, and (2) means responsive to the duty cycle signal for proportioning the number of total cycles to be applied to the radiant heating element in conformance with the ratio of voltage squares, further comprising:

(i) means for producing an applied cycle signal representing the number of cycles of the source voltage applied to the load during the heating period;

(ii) means for producing a total cycle signal representing the number of total cycles produced by the source during the heating period including a cycle just commencing;

(iii) means responsive to the duty cycle signal, the applied cycle signal, and the total cycle signal for producing a first duty cycle error signal representing the difference between the duty cycle signal and the ratio of applied cycles to total cycles;

(iv) means responsive to the duty cycle signal, the applied cycle signal, and the total cycle signal for producing a second duty signal and the ratio of applied cycles including the cycle just commencing to the total number of cycles; and (v) means responsive to the first and second duty cycle error signals for selectively applying or withholding the just commencing cycle to the load in accordance with the lesser of the duty cycle error signals.

5. The apparatus of claim 4 wherein the heating period signal producing means further comprises means for selecting the length of the interval.

6. Apparatus for controlled radiant heating of an article by a plurality of radiant heat elements energized from an alternating current source producing a voltage subject to variations from a nominal value, the apparatus comprising:

(a) means for producing a high power period signal representing a selectable time interval of high power energization of the heating elements;

(b) means for producing a low power period signal representing a selectable time interval of low power energization of the heating elements (c) means for producing a minimum voltage signal representing the minimum value the source voltage can reach;

(d) means for producing an actual voltage signal representing the actual value of the source voltage;

(e) means for producing an actual voltage signal representing the actual value of the source voltage;

(f) cycle applying means responsive to the high power period signal, the low power period signal, the minimum voltage signal, and the actual voltage signal for selectively applying cycles of the source voltage to the radiant heating elements to conform the power delivered thereto respectively to high and lower powers predictable from the minimum voltage during the high and low power period;

(g) means for selecting a high power period independently for each radiant heating element;

(h) means for selecting a low power period independently for each radiant heating element; and (i) said cycle applying means further comprising (i) means for producing a first duty cycle signal representing the ratio of the square of the minimum voltage to the square of actual voltage, (ii) means responsive to the first duty cycle signal for proportioning the number of total cycles applied to the heating elements during the high power period in conformance with the ratio of the voltage squares;

(iii) means for producing a second duty cycle signal representing a fraction of the ratio of the square; and (iv) means responsive to the second duty cycle signal for proportioning the number of total cycles applied to the heating elements during the low power period in conformance with the fraction of the voltage squares.

7. The apparatus of claim 6 wherein the proportioning means further comprises:

(a) means for producing an applied cycle signal representing the number of cycles of the source voltage applied to the load during the heating period;

(b) means for producing a total cycle signal representing the number of total cycles produced by the source voltage during the heating period including a cycle just commencing;

(c) means responsive to the duty cycle signal, the applied cycle signal and the total cycle signal for producing a first duty cycle error signal representing the difference between the duty cycle signal and the ratio of applied cycles to total cycles;

(d) means responsive to the duty cycle signal, the applied cycle signal, and the total cycle signal for producing a second duty cycle error signal representing the difference between the duty cycle signal and the ratio of applied cycles including the cycle just commencing to the total number of cycles; and (e) means responsive to the first and second duty cycle error signals for selectively applying or withholding the just commencing cycle to the load in accordance with the lesser of the duty cycle error signals.

* * * * *